(No Model.)

F. H. HOMAN.
SASH WEIGHT.

No. 501,346.  Patented July 11, 1893.

Witnesses:
Wm. A. Schoenborn.
Aug. F. Johnson.

Inventor:
Frank H. Homan
By Johnson & Johnson
his Attorneys.

UNITED STATES PATENT OFFICE.

FRANK H. HOMAN, OF PATCHOGUE, NEW YORK.

SASH-WEIGHT.

SPECIFICATION forming part of Letters Patent No. 501,346, dated July 11, 1893.

Application filed January 21, 1893. Serial No. 459,125. (No model.)

*To all whom it may concern:*

Be it known that I, FRANK H. HOMAN, a citizen of the United States, and a resident of Patchogue, in the county of Suffolk and State of New York, have invented certain new and useful Improvements in Sash-Weights, of which the following is a specification.

I have produced an improved weight used for balancing window sashes whereby it can be applied at once to balance any weight of sash. Its construction is such as to render it rigid and complete for attachment to the sash cord or chain. Its multiple sections are strung upon a rod the lower portion whereof is screw threaded. Its upper portion terminates in a hook which permits it to be quickly applied to the chain or cord, and the upper weight section is formed with a slot or hold into which the hook is drawn after the chain is attached to make it a closed eye and thus prevent under any circumstance, the slipping of the cord or chain from the eye. A nut on the threaded end of the rod serves as the means of drawing the hook down into the slot of the upper weight and to clamp all the weight sections together against the hooked end of the rod, making it a single rigid weight.

Figure 1:
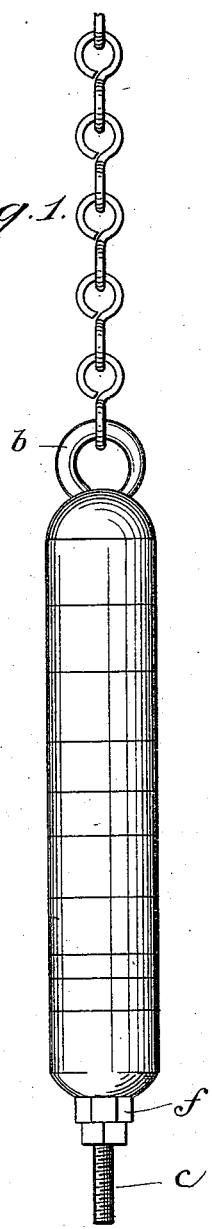
Figure 2:
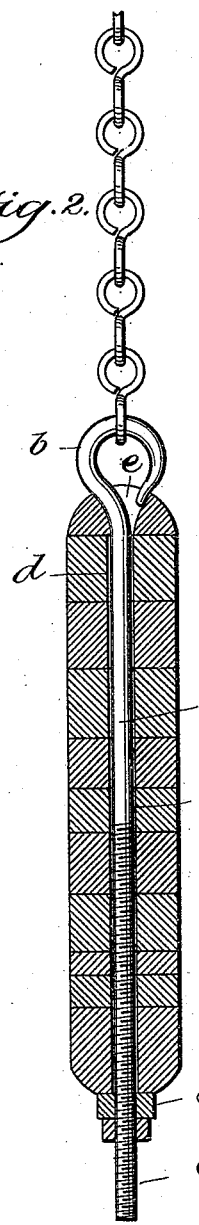
Figure 3:

The accompanying drawings show my improved sash window in elevation, the multiple sections being shown as of various weights in Figure 1. Fig. 2 is a vertical section of the same; and Fig. 3 is the top slotted weight.

The weight is constructed of a rod *a* formed into a return hook *b* at one end and with a screw thread *c* at its other end. The weights are made from one-quarter to say, ten pounds, each section having a different weight so as to graduate the weight to suit the sash. Each section has a central hole *d* by which it is fitted upon the rod. The upper weight section has a slot or hole *e* in its upper side and a nut *f* on its threaded end serves to draw the hook down into this slot or hole and to clamp all the weight sections together against this hook so as to make the weight a single rigid body. It will be understood that the chain or cord is connected to the hook before the latter is engaged with the weight and the hook being then drawn down into the slot or hole the chain or cord is thereby prevented from accidentally slipping off the hook, as it might otherwise be liable to do.

The rod may be screw threaded about two thirds of its length, and when the weight is completed the surplus length of the rod at its screw threaded end may be cut off. The nut when screwed tight to clamp the sections as stated can be locked in any suitable way. In this way the weight is made as compact as a single casting with the advantage of making the weight to suit any sash. The weight sections can be kept in stock and sold so as to make up any desired weight.

I have described the rod as being made with a hook and I so make it for the facility it affords in slipping an eye formed in the rope or the link of a chain upon the hook and then closing the latter by the upper section of the weight so as to form the hook into a closed eye. It is obvious however, that a snap hook may be used, but the construction shown is preferred because of its cheapness.

I claim as my improvement—

1. A sash we'ght comprising a suspending rod having a screw thread at one end and a hook at the other end, a multiple of weight sections on said rod, the upper section having a slot adapted to receive and close the open end of the hook to form an attaching clip, and a fastening nut, as shown and described.

2. The combination, in a sash weight, of a multiple of weight sections, a rod having a hook at one end and screw threaded at the other end, a nut and means for engaging the upper weight section with the end of said hook to close it, and securing it by said nut, substantially as described.

3. A sash weight having a central hole terminating in a slot at its upper end, in combination with a suspending rod having a hook, and a nut for securing the open end of said hook within and between the walls of said slot to form the weight attacher as described.

In testimony whereof I have hereunto signed this specification in the presence of witnesses.

FRANK H. HOMAN.

Witnesses:
JOHN A. POTTER,
WILLIAM BAILEY.